United States Patent
Biemans et al.

(10) Patent No.: US 11,341,867 B2
(45) Date of Patent: May 24, 2022

(54) MOVEMENT TRACKING AND SIMULATION DEVICE AND METHOD

(71) Applicant: Nissin Dental Products Inc., Kyoto (JP)

(72) Inventors: Wouter Biemans, The Hague (NL); Dyon Bode, Zegveld (NL); Luuk Steitner, Nieuw-Vennep (NL)

(73) Assignee: Nissin Dental Products Inc., Kyoto (JP)

( * ) Notice: Subject to any disclaimer, the term of this patent is extended or adjusted under 35 U.S.C. 154(b) by 711 days.

(21) Appl. No.: 16/083,628

(22) PCT Filed: Mar. 7, 2017

(86) PCT No.: PCT/EP2017/055339
§ 371 (c)(1),
(2) Date: Sep. 10, 2018

(87) PCT Pub. No.: WO2017/153416
PCT Pub. Date: Sep. 14, 2017

(65) Prior Publication Data
US 2019/0073924 A1    Mar. 7, 2019

(30) Foreign Application Priority Data
Mar. 10, 2016   (GB) .................................... 1604115

(51) Int. Cl.
*G06T 17/00* (2006.01)
*G09B 23/28* (2006.01)
(Continued)

(52) U.S. Cl.
CPC ............ *G09B 23/283* (2013.01); *G06F 3/011* (2013.01); *G06F 3/014* (2013.01); *G06F 3/0346* (2013.01); *G06T 17/00* (2013.01)

(58) Field of Classification Search
None
See application file for complete search history.

(56) References Cited

U.S. PATENT DOCUMENTS

| | | | |
|---|---|---|---|
| 8,716,973 B1 * | 5/2014 | Lammertse | B25J 9/1694 318/671 |
| 2002/0089544 A1 * | 7/2002 | Jahn | G06F 1/163 715/778 |

(Continued)

FOREIGN PATENT DOCUMENTS

| | | |
|---|---|---|
| JP | 2002296019 A | 10/2002 |
| JP | 2009192098 A | 8/2009 |

(Continued)

OTHER PUBLICATIONS

May 7, 2021, Office Action issued by the China National Intellectual Property Administration in the corresponding Chinese Patent Application No. 201780016289.8 with English language concise statement of relevance.

(Continued)

*Primary Examiner* — Vu Nguyen
(74) *Attorney, Agent, or Firm* — Kenja IP Law PC

(57) ABSTRACT

Apparatus for dental simulation comprising: a display; one or more processors; a hand piece comprising a light emitter and an inertial measurement unit (IMU), wherein the IMU is in communication with at least one of the one or more processors, and wherein the IMU is configured to generate IMU position and orientation data, wherein the IMU position and orientation data describes the position and orientation of the hand piece; at least two cameras in communication with at least one of the one or more processors, wherein each of the at least two cameras is configured to generate a series of images using light emitted by the light emitter; wherein the one or more processors are configured to: receive the series of images from each of the at least two (Continued)

cameras, generate, based on two dimensional coordinate data derived from the series of images, three dimensional coordinate data identifying the position of the LED; receive the IMU position and orientation data; and further wherein the one or more processors are configured to combine the IMU position and orientation data and the three dimensional coordinate data to generate simulation instructions, and to display, on the display, a three dimension virtual image of an object and animate movement of the object according to the simulation instructions.

17 Claims, 6 Drawing Sheets

(51) Int. Cl.
    *G06F 3/01*     (2006.01)
    *G06F 3/0346*     (2013.01)

(56) References Cited

U.S. PATENT DOCUMENTS

| | | | |
|---|---|---|---|
| 2006/0076917 A1 | 4/2006 | Lim et al. | |
| 2010/0167248 A1* | 7/2010 | Ryan | H04N 7/181 |
| | | | 434/262 |
| 2014/0306888 A1 | 10/2014 | Aoki et al. | |
| 2014/0320667 A1* | 10/2014 | Densham | H04N 9/3194 |
| | | | 348/169 |
| 2017/0071713 A1 | 3/2017 | Nakai | |

FOREIGN PATENT DOCUMENTS

| | | |
|---|---|---|
| JP | 2009294326 A | 12/2009 |
| WO | 2012/088285 A2 | 6/2012 |

OTHER PUBLICATIONS

Dec. 3, 2021, Office Action issued by the China National Intellectual Property Administration in the corresponding Chinese Patent Application No. 201780016289.8.

He Yu et al., Study on Imaging Tracking Simulation of the CCD, System Simulation Technology & Application, 2008, pp. 569-571, vol. 10.

* cited by examiner

MOVEMENT TRACKING AND SIMULATION DEVICE AND METHOD

FIELD OF THE INVENTION

The present invention relates to tracking the position and orientation of a moving hand piece and outputting, to a display, an image which moves in accordance with the tracked position of the hand piece. More specifically, the invention relates to tracking the movement of a hand piece in a dental simulation environment to simulate use of a dental tool.

BACKGROUND TO THE INVENTION

Machines to simulate dentistry techniques for training purposes are known and include, for example, the Simodont machine manufactured by the applicant. These machines implement virtual reality technology to allow a student to practice various dentistry procedures. The simulation machines generally comprise a display screen which outputs 3D images for viewing by the user wearing 3D glasses. Positioned below the display screen is at least one hand piece which is fixed to the machine by a mechanism comprising a series of linkages and electric motors which measure the relative position of the hand piece (as it is moved by the user) and the force applied by a user as the user conducts a dentistry operation (for example, drilling into a tooth) on a virtual 3D image of a tooth, set of teeth or jaw. The hand piece simulates a dentist's drill and provide haptic feedback to the student as the student performs their drilling.

Since the purpose of the machine is to provide a simulation environment for trainee dentists to practice with before they are required to perform the same techniques on a real, rather than a virtual, patient, the more realistic the simulation processes can be, the more immersed the student is in their training and the better the outcome, for both student and future patient.

A common tool used in dentistry is a small mirror on the end of a handle which is used by a dentist to view teeth and gums and other areas of the mouth which are not clearly visible from the dentist's angle of view. On the Simodont machine, a dentist's mouth mirror is simulated by a hand piece (which, unlike the hand piece to simulate a dentist's drill, does not provide haptic feedback) which is connected to the machine by a series of linkages. When the mirror hand piece is moved, the extent and angle of movement of the each linkages is measured and the relative position of the mirror hand piece is calculated. The virtual image of the dentist's mouth mirror on the display is moved accordingly. However, within the space the student moves the hand piece, the linkages limit the range of motion. The number of linkages required to provide adequate range of motion to the student (and so ensure that the student feels like he or she is actually handling a real mirror) compromises position accuracy. In addition, the weight of the linkages can be felt by a user (thereby lessening the 'realness' of the simulation) and the linkages are subject to wear and breakage through over-use or misuse.

It is an aim of the present invention to mitigate at least some of the above-mentioned drawbacks.

SUMMARY OF THE INVENTION

According to a first aspect of the invention, there is provided an apparatus for dental simulation according to appended claim 1. The apparatus allows for accurate movement tracking of a hand held object and to accurately translate the tracked movement into animation of a dentistry tool in a dental simulation environment.

According to a second aspect of the invention, there is provided a hand piece according to appended claim 15. Movement of the hand piece can be tracked by a medical simulation machine by virtue of a light source and means to measure orientation of the hand piece.

According to a third aspect of the invention, there is provided a computer implemented method according to appended claim 25. The method enables the accurate and efficient generation of instructions to replicate movement of a physical object to movement of a virtual object displayed on a viewing screen.

According to a fourth aspect of the invention, there is provided a system according to appended claim 30.

According to a fifth aspect of the invention, there is provided a system according to appended claim 34.

Preferable features of the invention are defined in the appended dependent claims.

BRIEF DESCRIPTION OF THE FIGURES

FIG. 4b is a profile view of the portion of a dental simulation machine shown in FIG. 4a;

DETAILED DESCRIPTION

Figure 1:
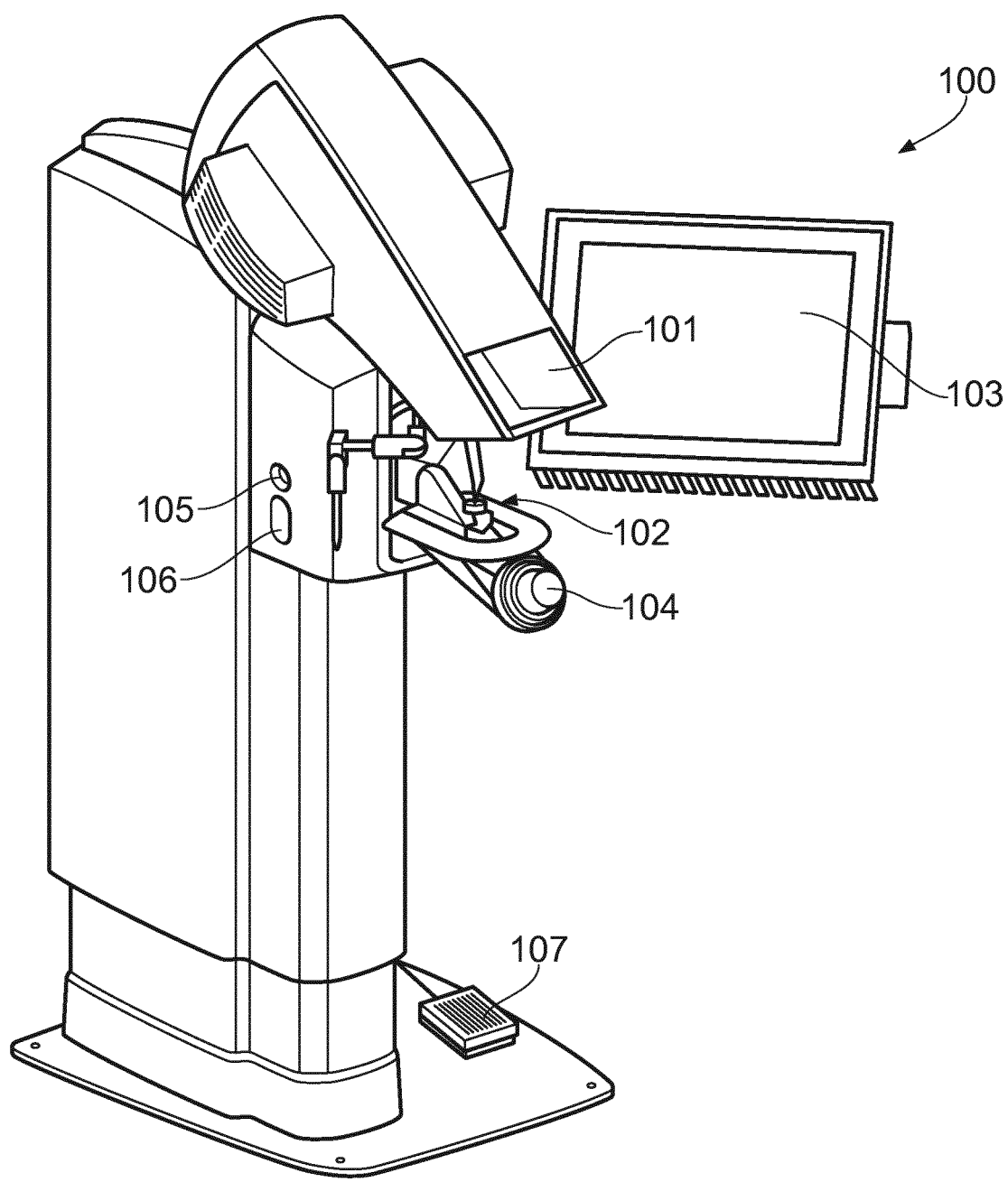
FIG. 1 is a perspective view of a dental simulation machine.

A dental simulation machine is shown generally at FIG. 1. The machine 100 is used by students of dentistry to practice dentistry techniques using augmented reality techniques. A student sits on a chair (not shown) facing viewing screen 101. Hand rest 102 defines, generally, an area in which the student simulates dentistry techniques. Power button 105 provides machine on/off functionality and height adjustment switch 106 allows the user to adjust the height of a position of the machine 100, including hand rest 102 and viewing screen 101. Viewing screen 101 displays virtual 3D moving images whose movements correspond with movement of a hand piece (which generally resides within area of hand rest 101) by a student. The student views the images on viewing screen 101 wearing passive 3D glasses. Mouse 104 allows the user of the machine to adjust the relative position and orientation of the images on viewing screen 101 in a virtual three dimensional space Foot pedal 107 facilitates control of operation of a simulated drill (or other powered dentistry tool).

The machine 100 also comprises training screen 103 (which may be a touch sensitive screen) which is used by the student to access information relevant to their training, such as training programs, individual lessons, scoring and marking data, mentor comments, and to review previous training material. While a simulation process is being performed, the images displayed on viewing screen 101 are also output to training screen 103 to allow an onlooker to view the student's use of the machine.

Figure 2:
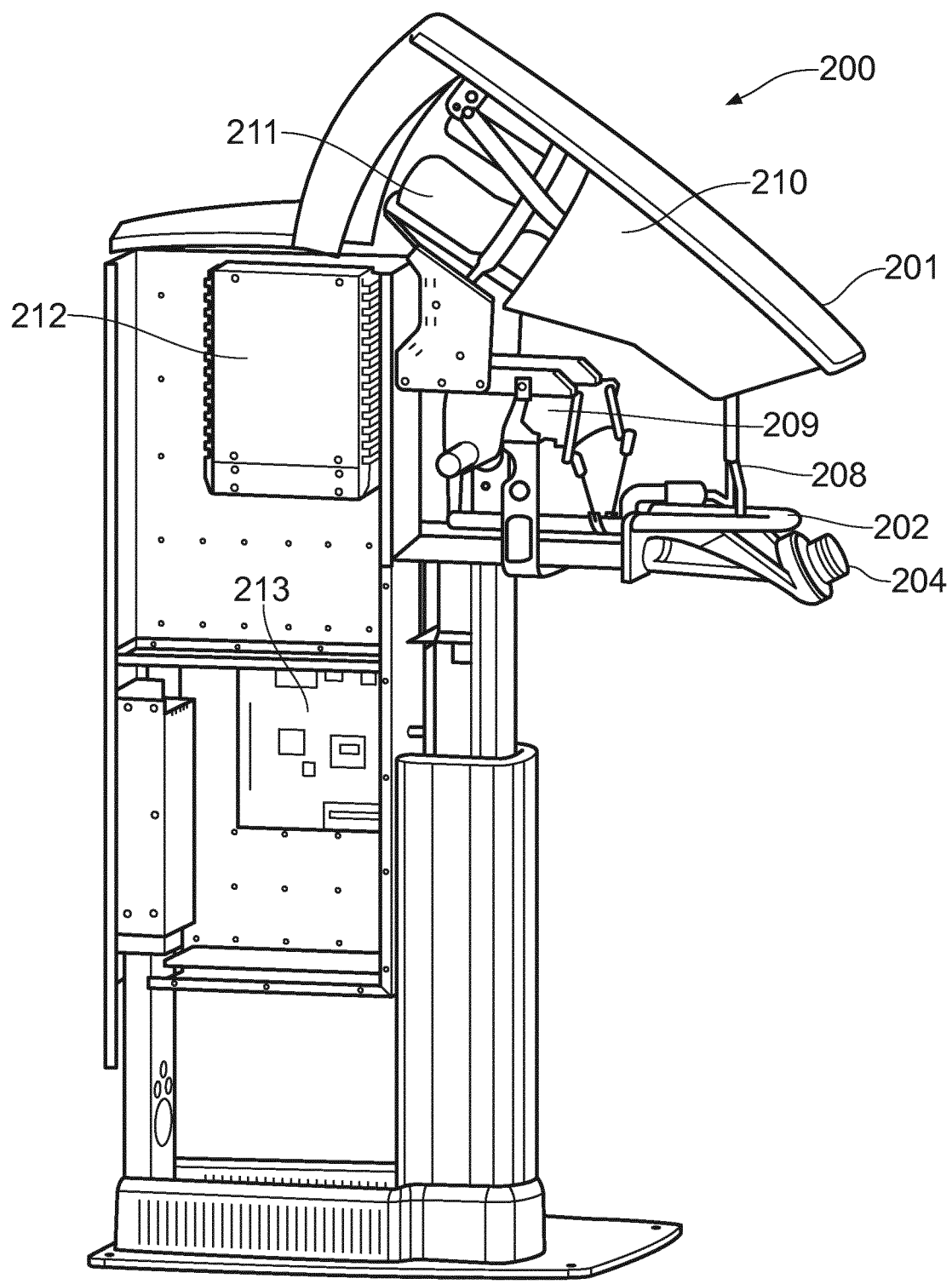
FIG. 2 is a cut-away perspective view of a dental simulation machine.

FIG. 2 shows some internal components of a dental simulation machine where reference signs of like components in FIG. 1 are increased by 100. The main processing capability of machine 200 is provided by central computer 213. Projectors 211 and optical box 210 provide the means to output 3D images onto display screen 201. Hand rest 102 of FIG. 1 is also shown in FIG. 2. Hand piece 208 ('hand piece' is generally used to mean any device or implement which can be held by hand) is used to simulate a dentist's drill. Hand piece 208 comprises a handle which generally looks and feels like the handle of a dentist's drill. However, the distal end of hand piece 208 (i.e. where a burr would be located) is connected to haptic display 209 by a series of linkages. The linkages and haptic display together comprise electric motors, a force sensor, an angular position sensor, and Inertial Measurement Unit (IMU) and potentiometers. Operation of a dentist's drill is simulated by a continuous feedback mechanism, controlled by haptic control unit 212, whereby the force applied and movement to the hand piece 208 by the user is fed to haptic control unit 212 which instructs appropriate operation of haptic display 209 to provide the required counter-force (to simulate interaction with a solid object), vibration (to simulate operation of a powered drilling tool) and restriction of movement in accordance with a set software routine (which may, for example, relate to a particular training session involving a particular dentistry operation).

Figure 3:
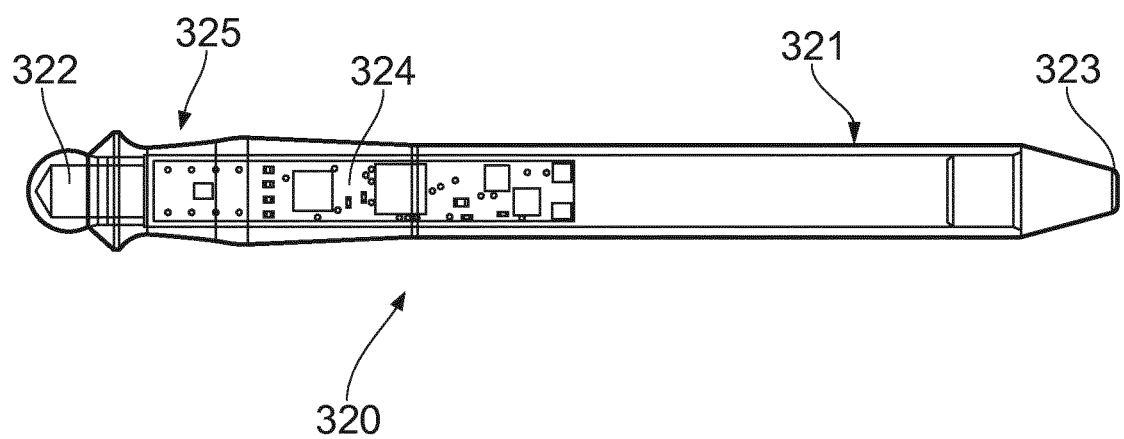
FIG. 3 is a schematic diagram of a mirror tracking device according to an embodiment of the present invention.

A preferred embodiment of the invention will now be described with reference to FIGS. 3-5. FIG. 3 shows a mirror hand piece 320 which is used, alone or in conjunction with hand piece 208, to simulate the use of a dentist's mouth mirror.

Mirror hand piece 320 comprises a housing 321, the dimensions of which are chosen to generally match the dimensions of the handle of a standard dentist's mouth mirror. Accordingly, housing 321 is preferably less than 12 mm in diameter, and is preferably less than or equal to 100 mm in length. The material from which housing 321 is made is chosen to allow external detection of light emitted by a light source/emitter 322 (where 'light' refers to any electromagnetic radiation). Preferably, the light emitter 322 is an infrared light emitting diode (LED). Light emitter 322 acts as an active infrared marker, as will be described further below. Housing 321 may be any suitable material such as metal, but is preferably a roughened plastic, which is also suitably ergonomic. The weight of mirror hand piece 320 is less than 30 grams and is intended to be gripped by a user's thumb and forefinger at channel 325.

Proximate end 323 of mirror hand piece 320 is connected to a camera PCB via a cable (not shown in FIG. 3). In an alternative embodiment, hand piece 320 comprises a battery and transmitter and communicates with camera PCB 435 wirelessly. Distal end 322 of housing 321 contains the infrared LED. The position of the LED is optically tracked (described further below) and is mapped to a virtual image of a mirror portion of a dentist's mouth mirror which is displayed, during a simulation exercise, on viewing screen 101.

Housing 321 of mirror hand piece 320 further comprises a small PCB which includes an Inertial Measurement Unit (IMU) 324. An IMU is a component which is widely used is various devices (including gaming consoles and mobile phones) and comprises gyroscopes and accelerometers to measure position and orientation in three dimensions. For each translational degree of freedom, standard IMUs integrate acceleration data to determine position values. For each rotational degree of freedom, angular velocity data is integrated to provide angular position data. IMUs may also include magnetometers to provide orientation data relative to the Earth's magnetic field. The magnetometer orientation data is used to re-calibrate the angular position data provided by the gyroscopes to compensate for inaccuracy caused by the accumulation of small integration errors. Detail regarding the operational principles of IMUs will be accessible to those skilled in the art.

Figure 4A:
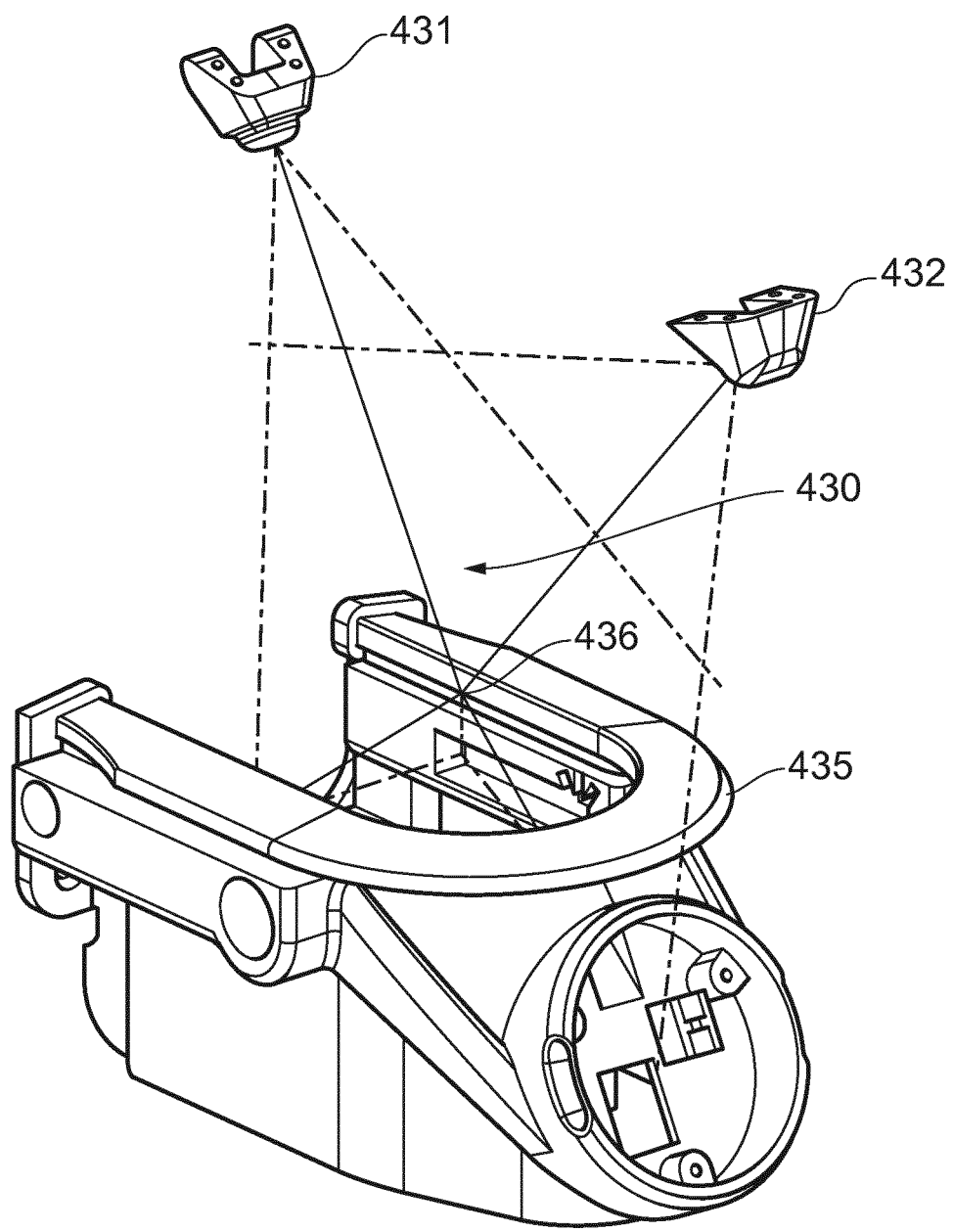
FIG. 4a is a perspective view of a portion of a dental simulation machine according to an embodiment of the invention.
Figure 4B:
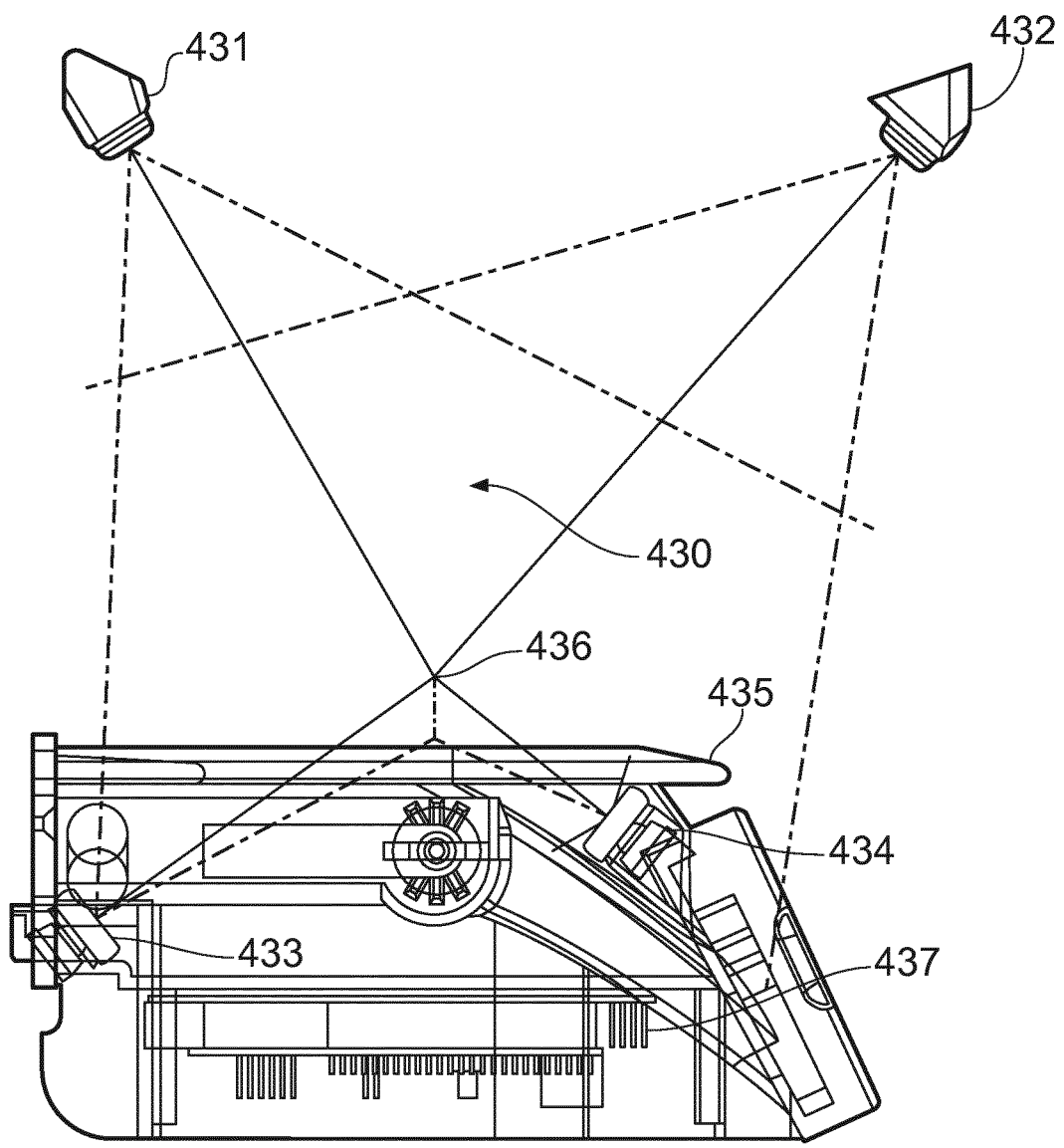

The general space within which movement of the mirror hand piece 320 is tracked is shown in FIGS. 4a and 4b as area 430. Area 430 is located above hand rest 435 and generally defines the area in which a student operates one or more mirror hand piece 320 and/or hand piece 208.

Two upper cameras 431 and 432 are fixed to optical box 210. Their field of view is directed downwards to the centre 436 of area 430. Two lower cameras 433 and 434 are located below hand rest 435, as can be seen from FIG. 4b, and are fixed to a structure which extends laterally from the main housing of machine 100 on which the hand rest 435 is located. In an alternative embodiment, all cameras are fixed to a structure that can be secured to hand rest 435, such that the structure can be attached and detached from the dental simulation machine 100. Lower cameras 433 and 434 are directed upwards to centre 436 of tracking area 430. Tracking area 430 is approximately 250 mm×200 mm×152 mm, as generally defined by the combined fields of view of cameras 431, 432, 433 and 434. Optical tracking avoids interference with operation of electric motors of the haptic display 209. In an alternative embodiment, an LED is integrated into the hand rest 435 to allow the user to view the position of the mirror hand piece 324 relative to hand rest 435 on viewing screen 201.

Cameras 431, 432, 433 and 434 are infrared cameras which detect the infrared emitted by LED 322 and capture images at 25 frames per second. The image feed, comprising a series of images captured by each camera while operational, is transmitted to a processor on camera PCB 437. For each image, a processor on PCB 437 performs a line scan of each line of pixels of a captured image to identify pixels whose grayscale brightness/intensity values is above a predefined threshold value. The predefined threshold value defines a range of intensity values (between a minimum intensity value of the threshold value and an unspecified maximum value) which are deemed to contain relevant information. Pixel data relating to pixels having intensity values below the threshold are disregarded.

For each image, pixel data relating to pixels having intensity values above the threshold is analysed by a processor of PCB 437 to identify clusters of pixels. The largest cluster of pixels is identified and it is the centre of the largest cluster which identifies the position of LED 322 within the image. Because the processor of PCB 437 adopts a 'blob tracking' technique and does not further analyse pixels after determining that their brightness value is below the threshold value, only a portion of the entire image is processed further. As such, the processing resource required to identify the LED in 2D is less than if every pixel of the image required analysis.

A processor of PCB 437 determines, for each image from each camera, the x and y coordinates of the centre of the largest cluster of pixels and so generates, in real-time, a series of 2D position coordinates for each camera feed. Four series of 2D coordinates are sent to main computer 213.

Figure 5:
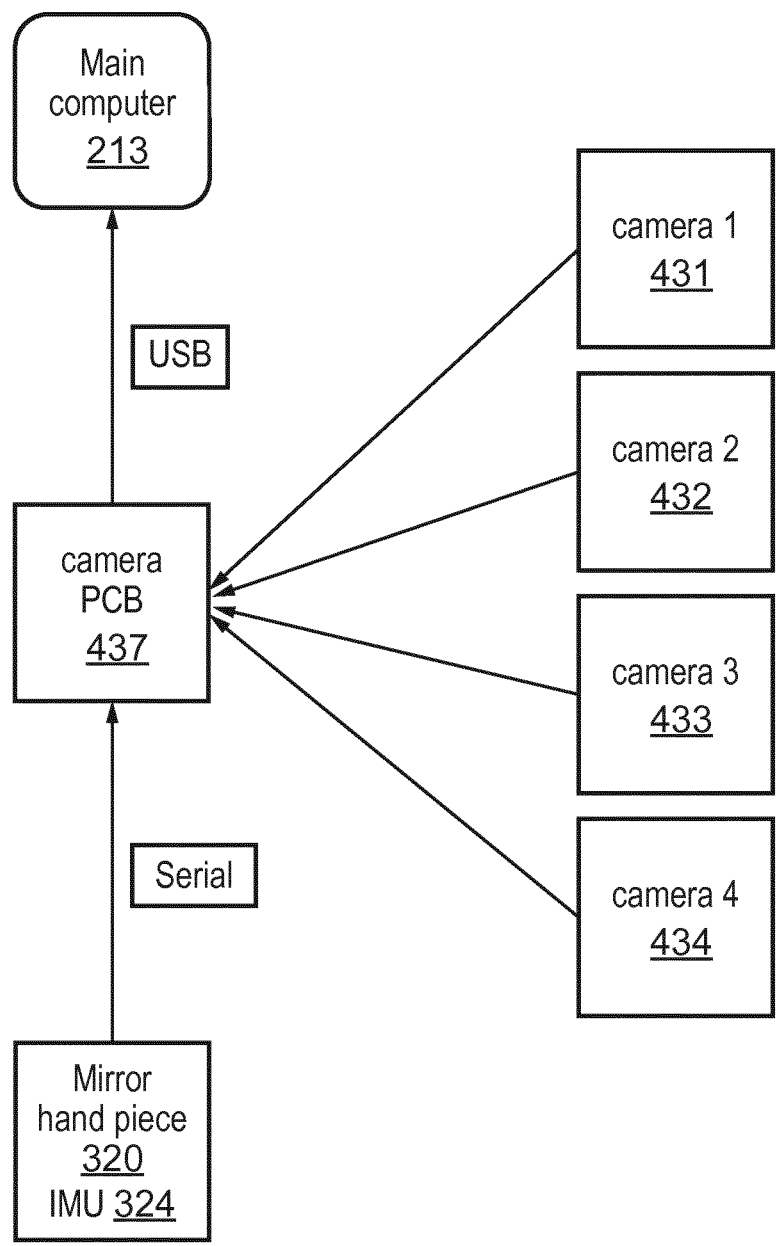
FIG. 5 is a schematic diagram of the main hardware components of a tracking system in accordance with an embodiment of the present invention.

The main hardware components are shown in FIG. 5. In addition to receiving images from each camera, camera PCB 437 also receives data from IMU 324 in mirror hand piece 320 via a serial protocol. Along with the series of x, y coordinates for each camera feed, camera PCB passes position and orientation data from IMU 324 to main computer 213 of machine 100.

Main computer 213 processes data received from camera PCB 437 using a dynamic loading mechanism, the principles of which will be accessible to a person skilled in the art. Using a set of four x, y coordinate pairs (each pair corresponding to LED coordinates from respective cameras), computer 213 performs, in real time and within a dynamic loading library, a triangulation operation to generate x, y, z coordinates which specify the position of LED 322 within area 430. The rate of generation of x, y, z coordinates is the same as the camera frame rate. The accuracy of the x, y, z data is improved, and the processing resource to perform the triangulation increased, with increasing numbers of cameras. It will be understood that a minimum of two cameras is required to provide sufficient data to perform triangulation and generate 3 dimensional position data.

The IMU 234 generates position and orientation data 100 times per second and so the main computer 213 receives update position and orientation data at the rate. It is the position data from the IMU (providing position data more frequently than the camera PCB) which is the primary source of position data for animating a virtual image of a dentist's mouth mirror on viewing screen 201. However, due to small errors which may be introduced when integrating, by the IMU 324, acceleration to provide position data, the IMU position data received by the main computer 213 may be inaccurate. To address this, the x, y, z position data using the x, y coordinates from the camera data is used to correct and re-calibrate the IMU position data.

Data relating to the orientation and rotation of mirror hand piece 320 is also provided by the IMU, and is also received by the main computer 213 with the IMU position data. Along with the IMU position data (which includes, periodically, corrected IMU position data), the orientation and rotational data provide a complete description, in real time, of the movement of the hand piece 320 in three dimensions. The absolute position accuracy of the position data of the mirror hand piece 320 is less than or equal to 2 mm and the absolute orientation accuracy of the orientation data of the mirror hand piece 320 is less than or equal to 1 degree.

The relative position resolution is less than 0.15 mm and the relative orientation resolution is less than 0.1 degree. The total system latency is less than 30 ms.

Main computer 213 generates instructions based on the position and orientation data of the tracked mirror hand piece and instructs a simulation program to adjust the relative position and orientation of a virtual image of a mouth mirror on viewing screen 201 in accordance with the determined position and orientation data of the mirror hand piece. As the mirror hand piece 320 is moved by a user in area 430, the virtual image of a dentist's mouth mirror is animated in 3 dimensions accordingly, and the student is able to view, using the mirror, a virtual three dimensional image of one or more teeth from different angles. To appropriately simulate the reflectance of a mirror, the image represented on the mirror face of the virtual mirror must be rendered four times, rather than two (for standard stereoscopic viewing).

Whilst the invention has been described above with reference to tracking a device for simulating a dentist's mirror, it should be understood that the described process can simulate any free-moving handheld implement which does not require force feedback.

The invention claimed is:

1. Apparatus comprising
    a display;
    one or more processors;
    a hand piece comprising a light emitter and an inertial measurement unit (IMU), wherein the IMU is in communication with at least one of the one or more processors, and wherein the IMU is configured to generate IMU position and orientation data, wherein the IMU position and orientation data describes the position and orientation of the hand piece;
    at least two cameras in communication with at least one of the one or more processors, wherein each of the at least two cameras is configured to generate a series of images using light emitted by the light emitter;
    wherein the one or more processors are configured to:
        receive the series of images from each of the at least two cameras,
        generate, based on two dimensional coordinate data derived from the series of images, three dimensional coordinate data identifying the position of the light emitter;
        receive the IMU position and orientation data;
    and further wherein the one or more processors are configured to combine the IMU position and orientation data and the three dimensional coordinate data to generate simulation instructions, and to display, on the display, a three dimension virtual image of an object and animate movement of the object according to the simulation instructions, and
    wherein at least one of the one or more processors is configured to scan each pixel line of each of the series of images from each camera to determine which pixels have an intensity value above a predetermined threshold value.

2. The apparatus of claim 1, wherein the simulated image is a dentist's mouth mirror.

3. The apparatus of claim 1, wherein the cameras are infrared cameras and wherein the light emitter is an infrared LED.

4. The apparatus of claim 1, wherein the cameras comprise 4 cameras.

5. The apparatus of claim 1, wherein the one or more processors are further configured to generate, for each image, two dimensional coordinate data identifying the position of the light emitter in the image.

6. The apparatus of claim 1, wherein the hand piece is movable within a tracking space, and wherein the apparatus further combines a second hand piece which is movable within the tracking space.

7. The apparatus of claim 1, wherein the one or more processors are further configured to display, on the display, a three dimensional simulated second object corresponding to the second hand piece, and to animate movement of the second object according to movement of the second hand piece.

8. The apparatus of claim 1, wherein the hand piece is connected to the apparatus by a cable but is otherwise freely movable.

9. The apparatus of claim 1, wherein at least one of the one or more processors generates data identifying pixels having an intensity value above the predetermined threshold value.

10. The apparatus of claim 9, wherein the data identifying pixels having an intensity value above the predetermined threshold value is analysed to identify clusters of pixels having an intensity value above the predetermined threshold value.

11. The apparatus of claim 10, wherein the clusters of pixels having an intensity value above the predetermined threshold value are analysed to identify the largest cluster, wherein the centre of the largest cluster defines the position of the LED within the image.

12. The apparatus of claim 1, wherein the three dimensional coordinate data and the IMU position and orientation data are combined in a dynamic loading library.

13. The apparatus of claim 1, wherein the one or more processors use the three dimensional coordinate data to correct errors in the position data in the IMU position and orientation data.

14. A computer-implemented method of simulating, in a dental simulation environment, movement of an object having a light source and an inertial measurement unit (IMU), comprising:
   receiving a series of images from at least two cameras, wherein each of the series of images are captured using light emitted by the light source;
   analysing each of the images in the series of images to determine one or more regions of the image that indicate the position of the light source in the image;
   determining two dimensional position data identifying the position of the light source in the image;
   receiving IMU data from the IMU;
   determining three dimensional position and orientation data identifying the position and orientation of the light source based on the IMU data and two dimensional position data;
   generating simulation instructions based on the three dimensional position and orientation data; and
   animating an image of an object on a display according to the simulation instructions,
   wherein analysing each of the images comprises scanning each line of pixels in each image to identify pixels having a brightness value above a predetermined threshold value.

15. The computer-implemented method of claim 14, wherein determining the two dimensional position data comprises identifying a cluster of pixels having a brightness value above the predetermined threshold value and identifying the coordinates of the centre of the cluster.

16. The computer-implemented method of claim 14, wherein the position data provided by the IMU is compared to the three dimensional coordinates and wherein the three dimensional position data periodically corrects the position data from the IMU.

17. A machine readable storage medium comprising instructions which, when executed by a processor, cause the method of claim 14 to be performed.

* * * * *